United States Patent [19]

Rowland

[11] 3,771,933
[45] Nov. 13, 1973

[54] MOLD FOR FORMING A METAL CORED ELASTOMERIC ROLL

[76] Inventor: Leroy J. Rowland, 500 Frampton St., Charleston, S.C.

[22] Filed: May 19, 1971

[21] Appl. No.: 144,829

[52] U.S. Cl.................... 425/113, 249/96, 425/468
[51] Int. Cl............................................. B29f 3/10
[58] Field of Search.................. 425/113, 114, 467, 425/468; 249/90, 94, 96, 85, 88

[56] References Cited
UNITED STATES PATENTS

| | | | |
|---|---|---|---|
| 3,380,120 | 4/1968 | Rowland et al................. | 425/468 X |
| 2,880,460 | 4/1959 | Monett........................... | 425/393 X |
| 1,745,482 | 2/1930 | Goodwin........................ | 425/129 |
| 2,129,680 | 9/1938 | Durant........................... | 249/90 |
| 3,100,676 | 8/1963 | Christie......................... | 249/96 X |

Primary Examiner—J. Spencer Overholser
Assistant Examiner—B. D. Tobor
Attorney—T. Russell Foster

[57] ABSTRACT

A mold for forming a rubber roll which includes a tubular casing arranged to be attached at one end to a rubber extrusion apparatus and provided with a plate member and cap at opposite ends having ports and central bores for supporting a metal core centrally in the casing interior both the core and plate member being retained against axial movement with the casing inner wall, a cavity of rubber material through the plate member ports to form an extruded rubber roll having a metal core.

8 Claims, 4 Drawing Figures

PATENTED NOV 13 1973 3,771,933
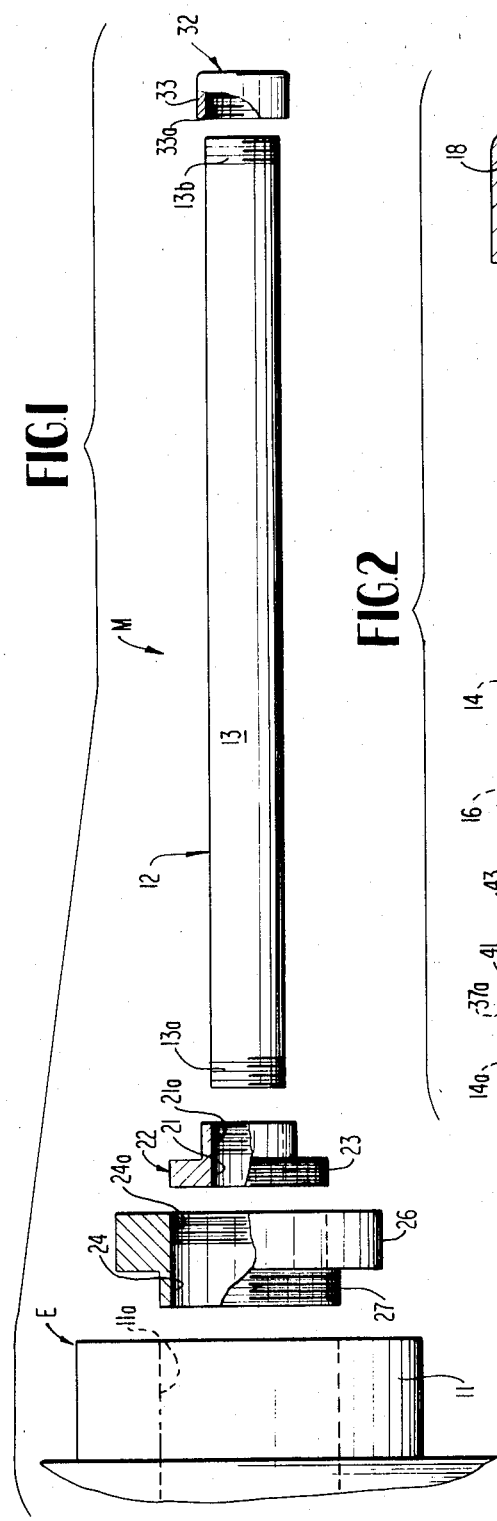
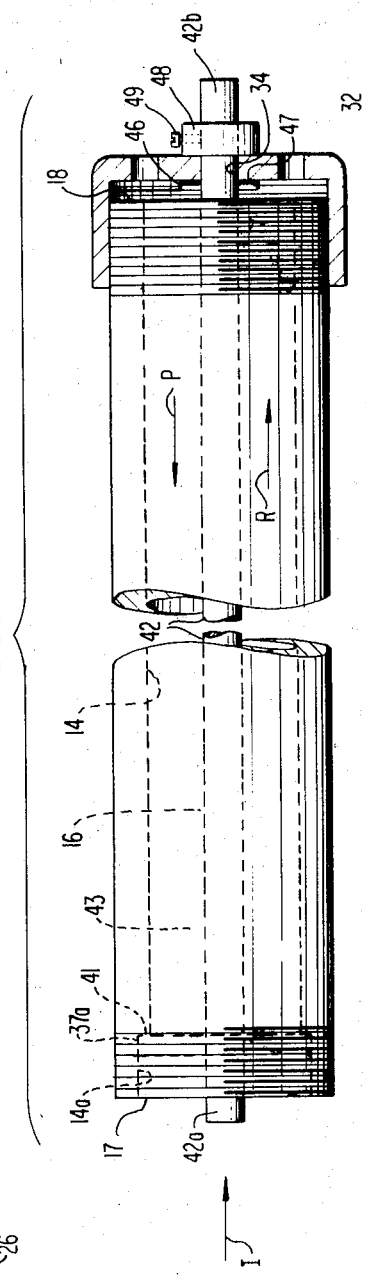
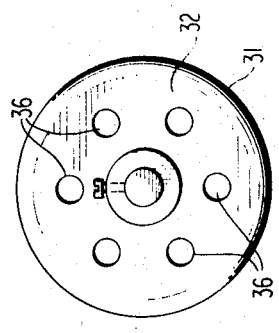
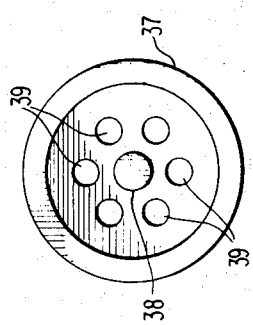
INVENTOR
LEROY J. ROWLAND
BY T. Russell Foster
ATTORNEY

MOLD FOR FORMING A METAL CORED ELASTOMERIC ROLL

This invention relates to a rubber roll and more particularly to a mold for forming a metal cored rubber roll.

A common type of roll in widespread use today is a roll having a metal core on which is formed a layer of elastomeric material such as rubber, such rubber rolls being used in many industries such as the paper industry, printing industry, textile industry and the like. In one conventional technique for manufacturing such rolls, a tubular casing is utilized which is arranged to be attached at one end to elastomeric material or rubber extrusion apparatus by means of which rubber is introduced into the mold under pressure. The core around which the rubber is molded, which forms an integral part of the roll, is centrally supported within the mold casing by means such as a spindle or the like so that when the rubber molding operation is completed, the core with the rubber layer adhered thereto is removed from the mold to form the resultant rubber roll.

It can be understood that in order to provide such molded rubber rolls of the desired concentricity, etc., it is necessary to support the rubber roll core on such spindles in precise co-axial relationship with the mold casing thus requiring the provision of an elaborate and complicated structures for supporting the core in the desired position within the casing. In addition, adding to the complexity of such present day mold structures, such molds must incorporate suitable means for permitting the introduction of elastomeric material discharged from the extruder into the mold cavity between the core and casing wall. This means that under the high pressures at which such extrusion apparatus is generally operated, intricate and complex structural arrangements must be provided for simultaneously maintaining the core in proper co-axial position while permitting the introduction of such elastomeric material smoothly and evenly into the mold. Such construction not only adds to the cost of such molds, which are used in large quantities, but frequently results in some misalignment, however slight, between the parts so that the resultant rubber roll does not always fall with the prescribed tolerances. One example of such a complex and expensive mold structure is that shown in U. S. Pat. No. 3,380,120 entitled "Manufacture of Metal Cored Rubber Rolls." In the construction of this patent, both a core and spindle are employed in association with many other component parts with the result that the cost and maintenance of such a mold as well as the assembly and disassembly of the mold for each molding operation adds to the production costs as well as imposing a severe limitation on the rate of production of such rolls.

Accordingly, a primary object of this invention is to provide a new and novel mold for forming a rubber roll.

Another object of this invention is to provide a new and novel mold for forming rubber rolls utilizing an extruder which permits the production of such rolls at a high production rate.

A further object of this invention is to provide a new and novel mold for forming a rubber roll which is simple and inexpensive in construction, which is capable of prolonged use with a minimum of maintenance and which is relatively easy to assemble and disassemble for each molding operation.

This invention further contemplates the provision of a new and novel mold for forming a rubber roll which utilizes a minimum of parts, which permits the production of rubber rolls within extremely close tolerances so as to produce such rolls with a minimum of scrap and at relatively low cost and which requires a minimum of finishing operations on the resulting rubber roll.

Other objects and advantages of the invention will become apparent from the following description taken in connection with the accompanying drawing.

The objects stated above and other related objects are accomplished by the provision of a tubular casing having a central bore arranged to be attached at one end to the outlet of an extruder. Cap means having a central bore are provided for closing the other end of the casing and a plate member having a central bore is arranged to be removably positioned within the casing central bore adjacent the casing one end. An elongated core member is provided which extends through the central bores of the plate member and cap means so that the core is supported within the casing bore in co-axial relationship therewith. Stop means being provided in the casing bore for retaining the plate member against axial movement towards the casing other end and means are provided for retaining the core against axial movement. Ports are provided in the plate member through which elastomeric material is introduced from the extruder into the mold between the core and casing inner wall to form a rubber roll having a rubber layer surrounding the core.

The novel features which are believed to be characteristic of the invention are set forth with particularity in the appended claims. The invention itself, however, both as to its organization and method of operation may be best understood by reference to the following description taken in conjunction with the accompanying drawing in which:

FIG. 1 is a side view of a mold constructed in accordance with the invention in association with extrusion apparatus;

FIG. 2 is a side view partially in section and partially broken away of the mold of FIG. 1;

FIG. 3 is left hand end view of the mold of FIG. 2; and

FIG. 4 is a right hand end view of the mold of FIG. 2.

Referring now to the drawing and to FIG. 1 in particular, there is shown a mold constructed in accordance with the invention and designated generally by the letter M. The mold M is of the type arranged to be detachably mounted on apparatus for extruding elastomeric material such as a screw-type extruder designated generally by the letter E. As is well known, the extruder E is of the type which delivers elastomeric material such as rubber under high pressure through an outlet 11 and is employed with the mold M for forming a rubber roll having a core.

As specifically illustrative of the invention, the mold M includes a tubular casing, designated generally by the numeral 12, having an outer surface 13 and an inner wall 14 defining a central bore 16. In the illustrated embodiment, the casing 12 is formed of metal and, in the preferred form, may be a metal pipe or the like having ends 17, 18.

Means are provided for attaching one end of the casing 12 to the outlet 11 of the extruder E. Although any suitable means may be provided for attaching the casing 12 to the extruder E, in the illustrated embodiment the casing outer surface 13 is provided with an externally threaded portion 13a adjacent the end 17. The threaded portion 13a is accommodated within the bore 21 of a fitting 22 for threaded engagement with an internally threaded portion 21a as shown in FIG. 1. The fitting 22 includes an externally threaded portion 23 of enlarged diameter which is arranged to be threadedly engaged with an internally portion 24a of a bore 24 in an adapter 26. The adapter 26 includes a portion of reduced diameter 27 which is externally threaded for threaded engagement with the outlet 11 of the extruder E, the outlet 11 also being internally threaded at 11a for engagement with the adapter portion 27. Thus, elastomeric material extruded out of the outlet 11 of the extruder E flows through the adapter bore 24, the bore 21 of the fitting 22 into the interior of the casing 12 in the direction of the arrow I in the assembled condition of the parts as shown in FIG. 1.

Cap means are provided for closing the other end of the casing 12. More specifically, the outer surface 13 of the casing 12 is provided with an externally threaded portion 13b adjacent the end 18 as shown in FIG. 2. As shown best in FIG. 2, the cap means includes a cap 31 having an end wall 32 and a tubular portion 33 which is internally threaded at 33a for threaded engagement with the threaded end portion 13b of the casing 12 to detachably mount the cap 31 on the end 18 of the casing in closing relationship therewith.

The cap end wall 32 is provided with a central bore 34 and a plurality of outlet ports 36 extending therethrough arranged in circumferentially spaced relationship and in radially spaced relationship with the central bore 34 to provide outlet ports for elastomeric material introduced into the bore 16 of the casing 12.

The mold M includes a plate member 37 preferably in the form of a circular disc having a peripheral surface 37a which is arranged to be removably positioned in the casing central bore 16 adjacent the casing end 17 and with the peripheral surface 37a in snug-fitting relationship with the casing inner wall 14. AS shown best in FIG. 3, the disc 37 is provided with a central bore 38 and a plurality of circumferentially spaced ports 39 extending therethrough and positioned in radially spaced relationship with the central bore 38.

As shown best in FIG. 2, stop means are provided for limiting axial movement of the plate member or disc 37 in the casing bore 16 towards the casing other end 18. More specifically, the casing bore 16 is provided with a portion 14a of enlarged diameter adjacent the end 17 to form a shoulder 41 on the casing inner wall 14. Thus, as shown in FIG. 2, the disc 37 is positioned in the casing bore 16 with its marginal edge portion in abutting engagement with the shoulder 41 thereby limiting axial movement of the disc 37 towards the casing end 18 under the pressure of the extruded elastomeric material exerted on the disc 37 in the direction of the arrow I.

The mold M also includes an elongated core 42 preferably in the form of a metal rod or the like having end portions 42a, 42b which forms a supporting core for the rubber layer in the resulting rubber roll produced in the mold M of the invention. The core 42 is positioned within the mold casing 12 with the end portions of the core extending through the central bores 38, 34 of the disc 37 and cap end wall 32 respectively as shown best in FIG. 2 so that the core is supported in the casing bore 16 in co-axial relationship with the casing 12. In the assembled position as shown in FIG. 1, the core 42 defines with the casing inner wall 14 an annular cavity 43 into which elastomeric material is introduced during the molding operation in the well known manner.

Means are provided for limiting the axial movement of the core 42 in the assembled position of FIG. 2 during the introduction of elastomeric material from the extruder E into the cavity 43 through the inlet ports 39 of the disc 37. More specifically, at least one radially extending pin member, and preferably two pin members 46, 47 are provided on the core end portion 42b. In the assembled position, the pin members 46, 47 engage the inner surface of the cap end wall 32 to limit axial movement of the core in the direction of the arrow R. In order to limit axial movement of the core 42 in the opposite direction as indicated by the arrow P, a radially extending stop member such as a sleeve member 48 is detachably mounted on the core end portion 42b. The sleeve member 48 is secured in a selected position on the core 42 by suitable means such as a set screw 49 for engagement with the outer surface of the cap end wall 32 as shown best in FIG. 2, It should be understood that any suitable means may be provided on the core 42 for limiting axial movement of the core 42 in the directions indicated by the arrows P, R and that the means shown merely illustrate one embodiment of such devices.

What is claimed is:

1. A mold for forming a metal cored elastomeric roll comprising, in combination, a tubular casing having an outer surface and an inner wall defining a central bore, means for attaching one end of said casing to the outlet of elastomeric material extrusion apparatus, cap means having an end wall for closing the other end of said casing, said cap means end wall having a central bore and a plurality of outlet ports for said elastomeric material, a plate member having a central bore and a plurality of inlet ports for said elastomeric material, said plate member being removably positioned in said casing central bore adjacent said casing one end in snug-fitting relationship with said casing innerwall, an elongated core member extending through said plate member and said cap means central bores for positioning said core centrally in said casing bore to define with said casing inner wall an annular cavity, stop means on said casing inner wall for limiting movement of said plate member in said casing bore towards said casing other end, means on said core engagable with said cap means end wall for retaining said core against axial movement during the introduction of elastomeric material from said extruder into said cavity through said plate member inlet ports.

2. A mold in accordance with claim 1 wherein said plate member comprises a circular disc having a peripheral surface and a central bore and, wherein said disc inlet ports are arranged in circumferentially spaced relationship and in radially spaced relationship with said disc central bore, said disc being arranged to be removably positioned in said casing central bore adjacent said one end with said ports in communication with said extruder outlet and said cavity and with said peripheral surface in snug-fitting relationship with said casing inner wall.

3. A mold in accordance with claim 2 wherein said stop means include an annular shoulder on said casing inner wall adjacent said one end for limiting the axial movement of said disc towards said casing other end.

4. A mold in accordance with claim 2 wherein said means for attaching said casing one end to said extrusion apparatus comprises an internally threaded portion on said extrusion apparatus outlet and an externally threaded portion on said casing outer surface adjacent said one end threadedly engageable with said threaded portion on said extrusion apparatus outlet.

5. A mold in accordance with claim 2 wherein said means for retaining said core against axial movement includes at least one radially extending pin member on said core for engagement with the inner surface of said cap means end wall in the supported position of said core in said casing bore.

6. A mold in accordance with claim 5 wherein said means for retaining said core against axial movement includes a radially extending stop member detachably mounted on said core for engagement with the outer surface of said cap means end wall.

7. A mold in accordance with claim 6 wherein said cap means includes a tubular portion having an internally threaded inner wall and including an externally threaded portion on the outer surface of said casing adjacent said casing other end threadedly engageable with said cap means tubular portion for mounting said cap means on said casing other end.

8. A mold in accordance with claim 7 wherein said core member comprises a cylindrical rod.

* * * * *